United States Patent
Shmukler et al.

(10) Patent No.: US 10,123,200 B2
(45) Date of Patent: Nov. 6, 2018

(54) NEIGHBOR AWARENESS NETWORKING—CHANNEL SEQUENCE

(71) Applicant: Apple Inc., Cupertino, CA (US)

(72) Inventors: Maksim Shmukler, San Jose, CA (US); Lilach Zukerman, Pardesia (IL); Yoel Boger, Shoham (IL); Oren Shani, Kfar Saba (IL)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 15/097,123

(22) Filed: Apr. 12, 2016

(65) Prior Publication Data

US 2016/0309315 A1  Oct. 20, 2016

Related U.S. Application Data

(60) Provisional application No. 62/150,199, filed on Apr. 20, 2015.

(51) Int. Cl.
*H04W 4/20* (2018.01)
*H04W 8/00* (2009.01)
*H04W 48/10* (2009.01)
*H04L 29/08* (2006.01)
*H04W 72/02* (2009.01)
(Continued)

(52) U.S. Cl.
CPC ......... *H04W 8/005* (2013.01); *H04L 67/1068* (2013.01); *H04W 4/21* (2018.02); *H04W 48/10* (2013.01); *H04W 72/02* (2013.01); *H04W 76/16* (2018.02); *H04W 84/18* (2013.01)

(58) Field of Classification Search
CPC ..... H04W 4/206; H04W 8/005; H04W 48/10; H04W 72/02; H04W 76/026; H04W 84/18; H04L 67/1068
See application file for complete search history.

(56) References Cited

U.S. PATENT DOCUMENTS 8,744,506 B2 * 6/2014 Sadek .................. H04W 16/14
370/321
9,143,979 B1 * 9/2015 Lambert ........... H04W 28/0289
(Continued)

FOREIGN PATENT DOCUMENTS

WO  2006000955  1/2006

OTHER PUBLICATIONS

Extended European Search Report for European Patent Application No. 16166161.6, dated Sep. 12, 2016, pp. 1-8.

*Primary Examiner* — Alpus Hsu
(74) *Attorney, Agent, or Firm* — Meyertons Hood Kivlin Kowert & Goetzel, P.C.; Jeffrey C. Hood; Brian E. Moore

(57) ABSTRACT

In some embodiments, one or more wireless stations operate according to Neighbor Awareness Networking (NAN)—direct communication with neighboring wireless stations, e.g., direct communication between the wireless stations without utilizing an intermediate access point. In a NAN system, multiple NAN devices may operate in conjunction in the form of a NAN cluster to facilitate communications processes, and may be further organized into "NAN data clusters" within NAN clusters. NAN data clusters may use a common base channel to convey communications among member NAN devices. Embodiments herein provide mechanism by which a base channel may be determined, modified, and/or distributed among NAN devices operating in a NAN data cluster.

20 Claims, 8 Drawing Sheets

(51) Int. Cl.
*H04W 4/21* (2018.01)
*H04W 84/18* (2009.01)
*H04W 76/16* (2018.01)

(56) References Cited

U.S. PATENT DOCUMENTS

| | | | |
|---|---|---|---|
| 9,178,893 B2 | 11/2015 | Miller et al. | |
| 9,210,731 B2 | 12/2015 | Wentink et al. | |
| 9,313,103 B2* | 4/2016 | Abraham | H04W 8/005 |
| 9,503,961 B2* | 11/2016 | Oren | H04W 40/244 |
| 9,516,686 B2* | 12/2016 | Barbieri | H04W 76/023 |
| 9,521,044 B2* | 12/2016 | Abraham | H04W 8/005 |
| 9,521,192 B2* | 12/2016 | Qi | H04L 67/104 |
| 9,544,754 B1* | 1/2017 | Lambert | H04W 8/005 |
| 9,602,998 B2 | 3/2017 | Qi | |
| 9,661,558 B2* | 5/2017 | Dominguez | H04W 48/16 |
| 9,763,073 B2* | 9/2017 | Segev | H04W 8/005 |
| 9,801,039 B2* | 10/2017 | Oren | H04W 8/005 |
| 9,820,131 B2* | 11/2017 | Abraham | H04W 8/005 |
| 9,872,227 B2* | 1/2018 | Shukla | H04W 48/10 |
| 9,872,232 B2* | 1/2018 | Shukla | H04W 48/16 |
| 9,998,535 B2* | 6/2018 | Liu | H04L 29/08072 |
| 2007/0195808 A1* | 8/2007 | Ehrlich | H04L 45/04 370/408 |
| 2009/0116430 A1* | 5/2009 | Bonta | H04W 84/18 370/329 |
| 2012/0166671 A1* | 6/2012 | Qi | H04L 67/104 709/236 |
| 2014/0313966 A1* | 10/2014 | Shukla | H04W 48/10 370/312 |
| 2014/0355483 A1* | 12/2014 | Jang | H04W 8/26 370/254 |
| 2015/0131529 A1* | 5/2015 | Zhou | H04W 84/18 370/328 |
| 2015/0181633 A1 | 6/2015 | Kim et al. | |
| 2016/0157089 A1* | 6/2016 | Qi | H04W 76/046 370/254 |
| 2016/0157193 A1* | 6/2016 | Qi | H04W 56/00 370/350 |
| 2016/0212606 A1* | 7/2016 | Qi | H04L 65/4076 |
| 2016/0223333 A1* | 8/2016 | Thakur | H04W 40/20 |
| 2016/0278112 A1* | 9/2016 | Liu | H04W 8/005 |
| 2016/0374053 A1* | 12/2016 | Hareuveni | H04W 72/02 |
| 2017/0034769 A1* | 2/2017 | Kim | H04W 48/08 |

\* cited by examiner

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Increased NAN | 15 | 23 | 31 | 7 | 19 | 27 | 3 | 11 | 18 | 6 | 26 | 10 | 22 | 2 | 30 | 14 |
| Increase Absent | 17 | 25 | 12 | 21 | 29 | 4 | 16 | 28 | 9 | 24 | 13 | 32 | 5 | 20 | | | ically couple to the Internet in a wired fashion. Wireless
NEIGHBOR AWARENESS NETWORKING—CHANNEL SEQUENCE

PRIORITY DATA

This application claims benefit of priority to U.S. Provisional Application Ser. No. 62/150,199, titled "NAN Channel Sequence," filed Apr. 20, 2015 by Maksim Shmukler, Lilach Zukerman, Yoel Boger, and Oren Shani, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Embodiments described herein relate to coordinating direct communication between wireless stations (or peer devices) and neighboring wireless stations.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, one or more wireless stations operate according to Neighbor Awareness Networking (NAN)—direct communication with neighboring wireless stations, e.g., direct communication between the wireless stations without utilizing an intermediate access point. In a NAN system, multiple NAN devices may operate with one another in the form of a NAN cluster to facilitate communications processes, and may be further organized into "NAN data clusters" within NAN clusters. NAN data clusters may use a common base channel to convey communications among member NAN devices. Embodiments described herein provide mechanisms by which a base channel may be determined, modified, and/or distributed among NAN devices operating in a NAN data cluster.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
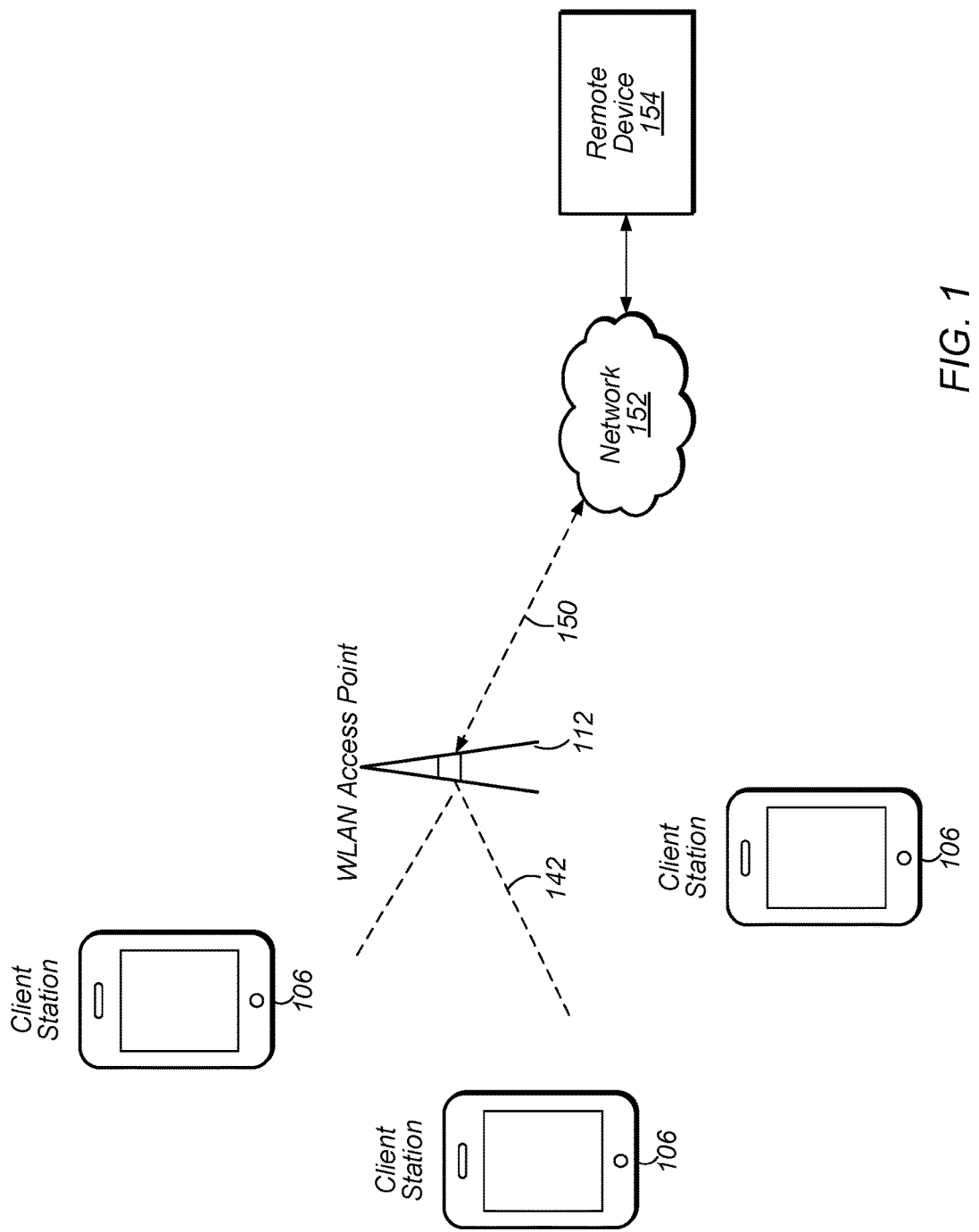
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Coinciding—refers to execution or performance of tasks occurring at or during the same time. Thus, a first process may have a first start time and a first end time and a second process may have a second start time and second end time. The first and second processes may be coinciding processes if: (1) the first and second start times are equivalent; (2) the first and second end times are equivalent; or (3) the first and second start times are different but each occur prior to either of the first and second end times. In other words, processes may be considered overlapping if performance of at least a portion of the processes overlap in time. For example, a first device may engage in a first negotiation (e.g., to establish a communication link) with a second device and may receive (or transmit) an indication of a second negotiation from (or to) a third device prior to completion of the first negotiation. Thus, the first and second negotiations may be coinciding negotiations.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, as further described below, a wireless device 106 may be configured to perform processes by which a base channel may be determined, modified, and/or distributed among NAN devices operating in a NAN data cluster.

Figure 2:
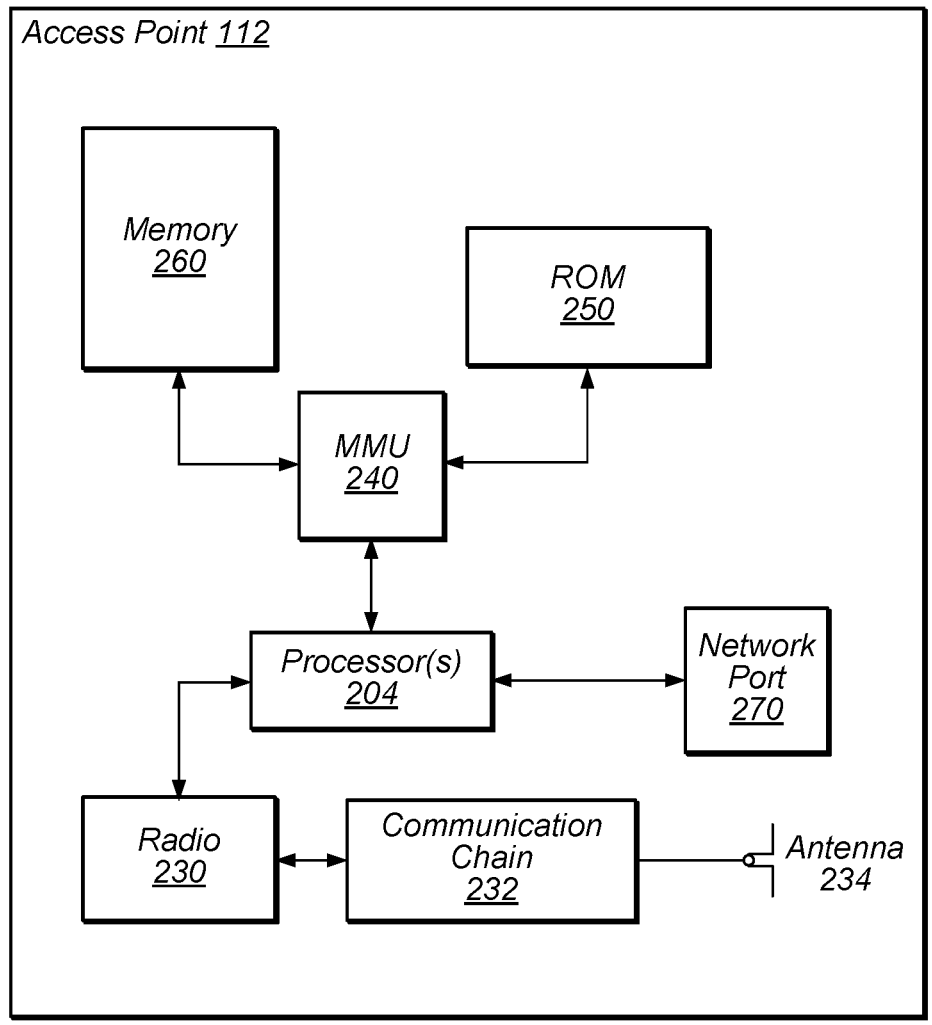
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to perform processes by which a base channel may be determined, modified, and/or distributed among NAN devices operating in a NAN data cluster.

Figure 3:
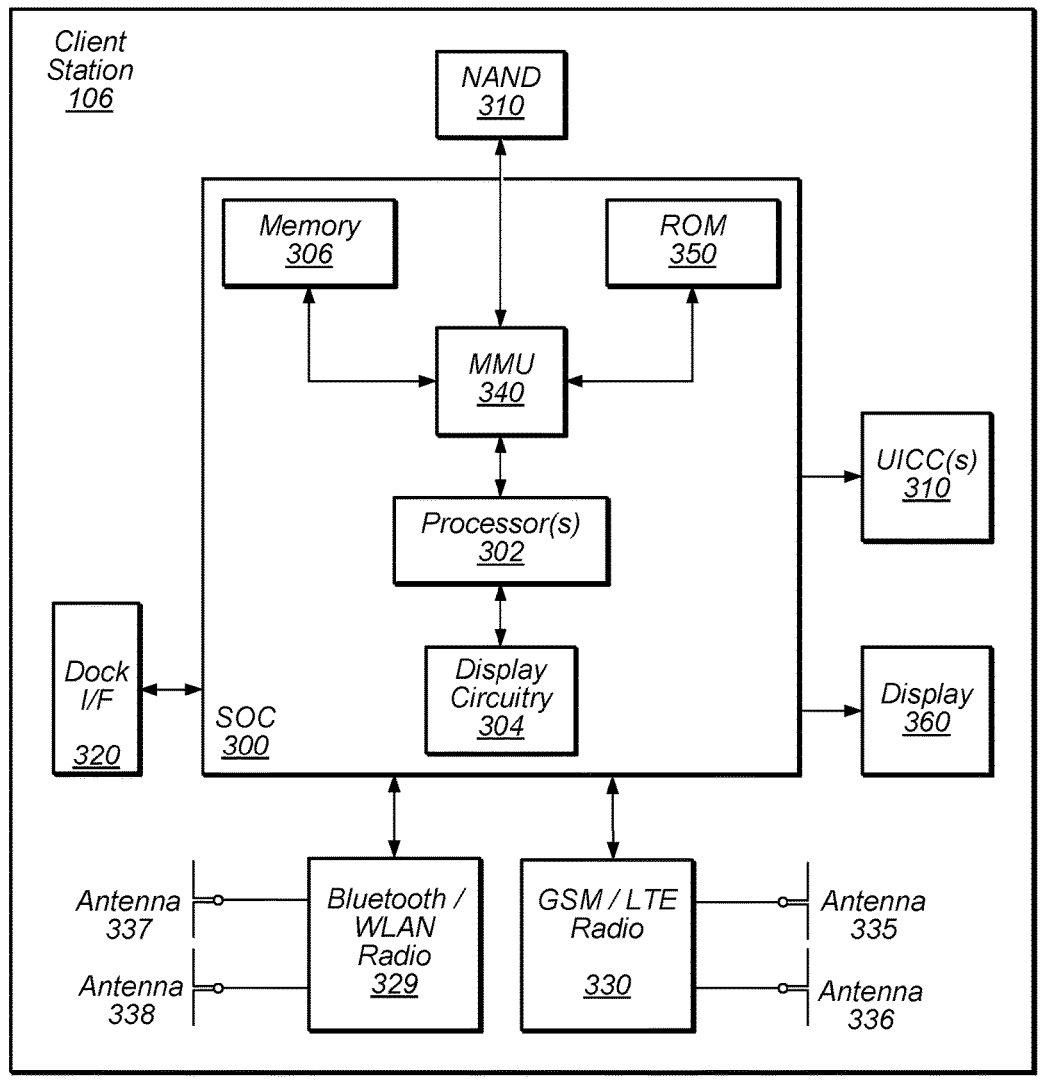
FIG. 3 illustrates an example simplified block diagram of a wireless station (UE), according to some embodiments.

FIG. 3—Client Station Block Diagram

FIG. 3 illustrates an example simplified block diagram of a client station 106. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform processes by which a base channel may be determined, modified, and/or distributed among NAN devices operating in a NAN data cluster.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each NAN device (or wireless station) may implement methods to ensure synchronization with a neighboring NAN device to which it is communicating. After two NAN devices have discovered each other (e.g., per NAN 1.0) they may implement a procedure to set up a NAN datapath between them in order to communicate. In some embodiments, when multiple NAN devices in a same neighborhood establish datapaths with each other it may be desirable (or beneficial) to group them together and coordinate their operations in order to facilitate power-efficient and low-latency communications. Two or more wireless stations (or NAN devices) may be organized into a NAN cluster to facilitate communication. A NAN cluster may provide benefits such as synchronization (e.g., to support concurrent service discovery and data communications) and robustness (e.g., to avoid a single point of failure). In some embodiments, a NAN cluster may refer to multiple peer wireless stations (e.g., peer NAN devices) linked via synchronization to a common time source (e.g., a common NAN clock).

In a NAN system operating according to embodiments described herein, a first NAN device may consider a second peer NAN device to be: (1) an "active data peer" if both the first NAN device and the second NAN device belong to the same NAN cluster and are determined to be engaged in data exchange with each other, including a high priority data exchange; or (2) an "idle data peer" if both devices do not belong to the same NAN cluster, or are determined not to be currently engaged in data exchange, or a high priority data exchange, with each other. A "NAN data cluster" may refer to a group of NAN devices within a NAN cluster, e.g., to a sub-cluster within a NAN cluster. More specifically, a NAN data cluster may refer to a collection of NAN devices and their active data peers, e.g., to a group of peer NAN devices belonging to the same NAN cluster and having at least one active datapath, e.g., a higher priority data path, with at least one member NAN device of the same NAN data cluster. Thus, a NAN cluster may include zero, one, or more than one NAN data cluster. A NAN device may belong to a NAN data cluster if it has one or more active data peers.

In other words, a NAN cluster may refer to multiple peer wireless stations linked (e.g., in communication) via one or more NAN data links (a communication link between peer wireless stations). Note that a peer wireless station may be a member of more than one NAN cluster. Further, a NAN data cluster may refer to a set of peer wireless stations in a common (e.g., same) NAN cluster that share a common base schedule (e.g., a NAN data cluster base schedule). In addition, peer wireless stations in a NAN data cluster may share at least one NAN data link (e.g., an active datapath) with another member wireless station within the NAN data cluster. Note that a peer wireless station may be a member of more than one NAN cluster; however, as noted previously, a NAN data link (e.g., a data link that includes an active datapath) belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

A certain level and/or class of data exchange between two devices, e.g., data exchange determined to be higher priority by certain criteria, may be required for devices to be considered active data peers (e.g., have an active data connection or datapath) and hence for them to participate in a data cluster. In some embodiments, the criteria for determining whether a device (e.g., a NAN device) is engaged in higher priority data exchange for the purpose of determining other devices with which it maintains an active datapath, e.g., for the purpose of determining its active data peers and forming data clusters, may vary across implementations. For example, different devices, or types of devices, may use different standards for defining ongoing data exchange as higher priority or lower priority according to their own resources (e.g., device power level and/or transmission power requirements) and conditions (medium contention or interference levels). The type, quantity, and demands of the data exchange, such as factors like throughput and latency, and/or various other items, such as quality of service of the datapath, may be considered. In some embodiments, because these criteria may be implementation specific and may depend on the local conditions of a device, a first device may determine a relationship between it and a second device differently than the second device. For example, the first device may consider the second device to be an active data peer, whereas the second device may consider the first device to be an idle data peer. In such instances, the devices may exchange information related to the classification of the data peer and negotiate whether the devices will consider one another active or idle data peers.

Base Channel Selection

In some embodiments, a NAN data cluster (or data cluster) may use a common base channel (e.g., a common channel that an entire NAN data cluster may use to allow all NAN devices within the NAN data cluster to communicate with each other) to perform communications between member NAN devices within the NAN data cluster. In some scenarios, these communications may include full bandwidth communications. A base channel used by the NAN data cluster may be a non-congested channel and may be distributed to, and usable by, each NAN device in the data cluster. Embodiments described herein provide methods for more efficiently selecting, modifying, and/or propagating a common base channel among one or more NAN devices, e.g., for use among devices within a NAN data cluster.

In a process of (or method for) determining a base channel for use in communications between one or more NAN devices, a NAN device may first determine and set its own base channel. The NAN device may select one of its own preferred NAN channels based on corresponding preference scores to serve as its base channel. The device's preferred NAN channels and their corresponding preference scores may have been determined earlier according to one of various methods, which may be implementation specific. The NAN device may select the preferred NAN channel with the highest preference score. If multiple preferred channels share the same highest preference score, certain bands may be prioritized. For example, the device may select a preferred channel associated with a 5 GHz band over the preferred channel of a 2.4 GHz band.

The NAN device may also advertise various items of information (e.g., parameters) usable in determining the base channel, such as one or more of: (1) channels unsupported by the device (especially if the device is limited to 2.4 GHz channels); (2) one or more NAN channels preferred by the device and associated (or corresponding) preference scores (e.g., two NAN channels and their corresponding preference scores in the case of a device supporting 2.4 GHz and 5 GHz bands such that each preferred channel corresponds with a supported band); (3) the base channel that is currently being used by the device; and/or (4) whether the device currently belongs to a NAN data cluster, and/or information regarding a NAN data cluster to which the device belongs. One or more of these items, and/or other information (or parameters), may be conveyed (transmitted) to neighboring NAN devices, e.g., via unicast service discovery frames (SDFs) sent (or transmitted) during service negotiations.

When a second NAN device receives the above mentioned information from a first NAN device, e.g., via an SDF, the second NAN device may process the information to select a common base channel. Thus, the two NAN devices may perform a base channel negotiation. The two devices may belong to the same NAN cluster, e.g., may be synchronized to a common anchor master and hence operate on a common time base, regardless of whether they may or will participate in a NAN data cluster within the NAN cluster. In some embodiments, the two devices may not communicate (or correspond, e.g., exchange one or more messages or transmissions) to determine the common base channel cooperatively or by a single, shared evaluation, but instead may act independently to determine a base channel based on channel information received from the other device, e.g., by evaluating an SDF received from the other device. However, by evaluating local and received information by similar processes, the two devices may reliably agree on a common base channel.

Thus, after receiving the information from the first NAN device, the second NAN device may select a base channel based on preferred NAN channels (and associated preference scores) of the two devices. For example, if both devices support 5 GHz and 2.4 GHz bands, each device may provide two preferred channels, one for each supported band, for a total of four preferred channels. If one of the devices does not support a proposed channel, the channel may be disqualified from further consideration as the base channel. The channel with a highest preference score may be selected as the base channel. In tie scenarios (e.g., when two or more of the preferred channels may share the highest preference score), various other items (parameters) may be considered to select the base channel.

For example, precedence (e.g., in the following order) may be given to: (1) a preferred channel proposed by a device belonging to a NAN data cluster over a channel preferred by a device that is not a member of a NAN data cluster; (2) a 5 GHz band channel over a 2.4 GHz band channel; and/or (3) a channel proposed by the device with the higher MAC address.

After the negotiation, both devices may adopt the selected channel in their preferences, e.g., record a preference for the selected (chosen) channel. For example, if the selected NAN channel is in the 2.4 GHz band, each device may modify its preferred 2.4 GHz NAN channel and associated preference score to the selected 2.4 GHz channel and its preference score. If the selected channel is in the 5 GHz band, each device may modify its preferred 5 GHz NAN channel and associated preference score to the selected 5 GHz channel and its preference score.

The two devices may then operate to adopt the selected channel as their base channels. If one or both devices do not belong to a NAN data cluster, the one or both devices that are not in a NAN data cluster may transition to the selected base channel in a following (subsequent) discovery window (DW) (e.g., slot[1] or slot[8]). If one or both devices belong to NAN data clusters that use different base channels than the newly selected channel, then one or both devices may initiate a procedure for modifying the base channel in their respective NAN data clusters. Thus, if one device, e.g., the first device, currently belongs to a NAN data cluster and the base channel of this data cluster does not match the newly chosen NAN channel, then the first device may initiate a procedure for modifying the base channel of its entire NAN data cluster while the second device (which does not belong to a data cluster) may modify its base channel to the newly chosen NAN channel at the following (subsequent) discovery window (e.g., slot[1] or slot[8]).

Figure 4A:
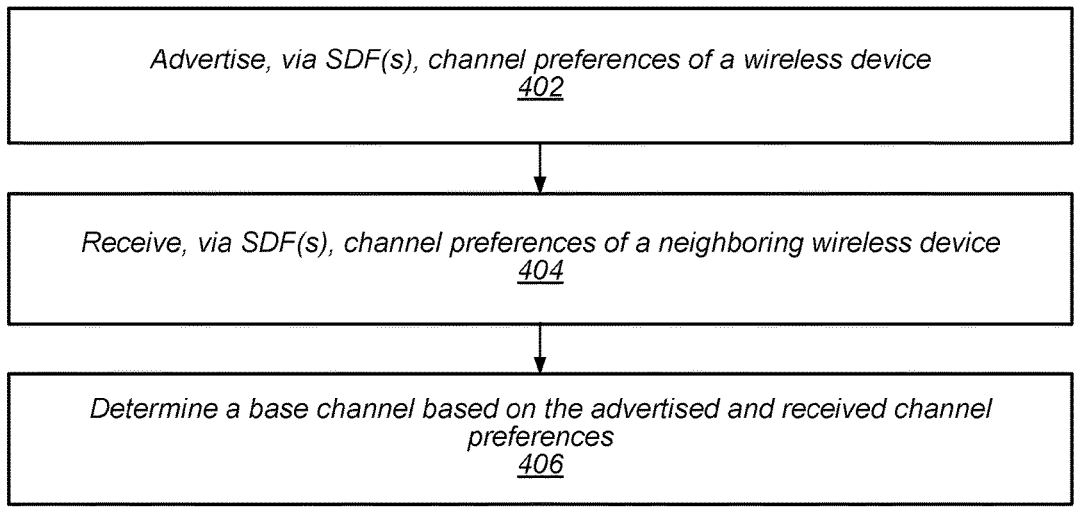
FIG. 4A illustrates an example method for negotiating a base channel between peer devices, according to some embodiments.

FIG. 4A illustrates a method for negotiating a base channel between peer devices, according to some embodiments. The method shown in FIG. 4A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 402, channel preferences (e.g., a set of channel preferences) may be advertised by a wireless device, such as client station 106. To advertise the channel preferences, the wireless device may transmit a service discovery frame (SDF) to one or more neighboring wireless devices. Thus, the wireless device may transmit a unicast and/or multicast SDF. The channel preferences may include one or more of: (1) channels unsupported by the wireless device (e.g., if the wireless device is limited to 2.4 GHz channels); (2) one or more channels preferred by the wireless device and associated (or corresponding) preference scores (e.g., two NAN channels and their corresponding preference scores); (3) an indication of a base channel currently being used by the wireless device; and/or (4) whether the wireless device currently belongs to a NAN data cluster, and/or information regarding a NAN data cluster to which the wireless device belongs.

At 404, the wireless device may receive respective channel preferences from one or more neighboring wireless devices. For each respective neighboring wireless device, the respective channel preferences may include one or more of: (1) channels unsupported by respective wireless device (e.g., if the respective wireless device is limited to 2.4 GHz channels); (2) one or more channels preferred by the respective wireless device and associated (or corresponding) preference scores (e.g., two NAN channels and their corresponding preference scores); (3) an indication of a base channel currently being used by the respective wireless device; and/or (4) whether the respective wireless device currently belongs to a NAN data cluster, and/or information regarding a NAN data cluster to which the respective wireless device belongs.

At 406, the wireless device may determine a new base channel (or channels) based on the advertised channel preferences and/or respective channel preferences received. In some embodiments, if one of the wireless devices does not support a proposed channel (e.g., as indicated by channel preferences), the proposed channel may be disqualified from further consideration as the new base channel. In some embodiments, the proposed channel with a highest preference score may be selected as the new base channel. In some embodiments, in tie scenarios (e.g., when two or more of the proposed channels may share the highest preference score), various other items (parameters) may be considered to select the base channel, e.g., precedence (e.g., in the following order) may be given to: (1) a preferred channel proposed by a wireless device belonging to a NAN data cluster over a channel preferred by a wireless device that is not a member of a NAN data cluster; (2) a 5 GHz band channel over a 2.4 GHz band channel; and/or (3) a channel proposed by a wireless device with a higher MAC address. In some implementations, other precedence parameters may be considered in any order with any/all of the preceding parameters. Further, in some implementations, the precedence parameters can be reordered in any fashion.

Figure 4B:
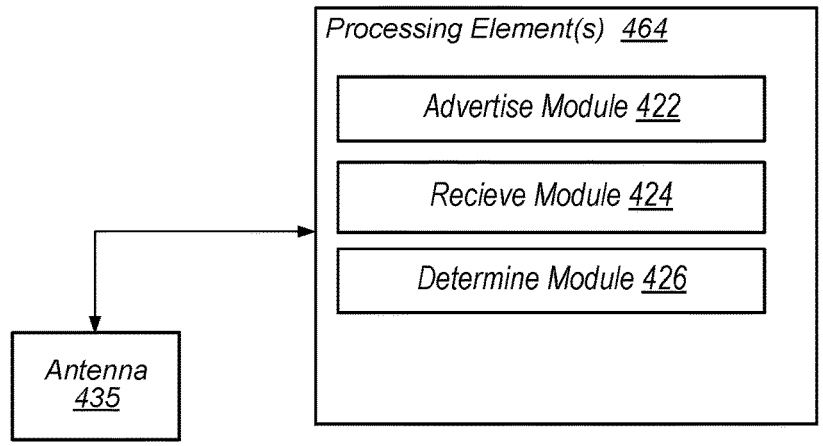
FIG. 4B illustrates an example processing element including modules for negotiating a base channel between peer devices, according to some embodiments.

FIG. 4B Figure illustrates a processing element including modules for negotiating a base channel between peer devices, according to some embodiments. In some embodiments, antenna 435 may be coupled (directly or indirectly) to processing element 464. The processing element may be configured to perform the method described above in reference to FIG. 4A. In some embodiments, processing element 464 may include one or more modules, such as modules (or circuitry) 422-426, and the modules (or circuitry) may be configured to perform various operations of the method described above in reference to FIG. 4A. In some embodiments, the processing element may be included in a client station, such as client station 106. As shown, the modules may be configured as follows.

In some embodiments, processing element 464 may include an advertise module 422 configured to advertise (or generate instructions to advertise) channel preferences (e.g., a set of channel preferences) associated with a wireless device. In some embodiments, to advertise the channel preferences, module 422 may be configured to transmit (or generate instructions to transmit) a service discovery frame (SDF) to one or more neighboring wireless devices. Thus, the SDF may be a unicast or multicast SDF. The channel preferences may include one or more of: (1) channels unsupported by the wireless device (e.g., if the wireless device is limited to 2.4 GHz channels); (2) one or more channels preferred by the wireless device and associated (or corresponding) preference scores (e.g., two NAN channels and their corresponding preference scores); (3) an indication of a base channel currently being used by the wireless device; and/or (4) an indication of whether the wireless device currently belongs to a NAN data cluster, and/or information regarding a NAN data cluster to which the wireless device belongs.

In some embodiments, processing element 464 may include a receive module 424 configured to receive (or generate instructions to receive) respective channel preferences from one or more neighboring wireless devices. For each respective neighboring wireless device, the respective channel preferences may include one or more of: (1) channels unsupported by respective wireless device (e.g., if the respective wireless device is limited to 2.4 GHz channels); (2) one or more channels preferred by the respective wireless device and associated (or corresponding) preference scores (e.g., two NAN channels and their corresponding preference scores); (3) an indication of a base channel currently being used by the respective wireless device; and/or (4) an indication of whether the respective wireless device currently belongs to a NAN data cluster, and/or information regarding a NAN data cluster to which the respective wireless device belongs.

In some embodiments, processing element 464 may include a determine module 426 configured to determine a new base channel (or channels) based on the advertised channel preferences and/or respective channel preferences received. In some embodiments, if one of the wireless devices does not support a proposed channel (e.g., as indicated by channel preferences), the proposed channel may be disqualified from further consideration as the new base channel. In some embodiments, the proposed channel with a highest preference score may be selected as the new base channel. In some embodiments, in tie scenarios (e.g., when two or more of the proposed channels may share the highest preference score), various other items (parameters) may be considered to select the base channel, e.g., precedence (e.g., in the following order) may be given to: (1) a preferred channel proposed by a wireless device belonging to a NAN data cluster over a channel preferred by a wireless device that is not a member of a NAN data cluster; (2) a 5 GHz band channel over a 2.4 GHz band channel; and/or (3) a channel proposed by a wireless device with a higher MAC address. In some implementations, other precedence parameters may be considered in any order with any/all of the preceding parameters. Further, in some implementations, the precedence parameters can be reordered in any fashion.

It is apparent for those skilled in the art that, for the particular processes of the modules (or circuitry) described above (such as modules 422, 424, and 426), reference may be made to the corresponding operations (such as operations 402, 404, and 406, respectively) in the related process embodiment sharing the same concept and the reference is regarded as the disclosure of the related modules (or circuitry) as well. Furthermore, processing element 464 may be implemented in software, hardware or combination thereof. More specifically, processing element 464 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 464 may be implemented as a general-purpose processor such as a CPU, and therefore each module can be implemented with the CPU executing instructions stored in a memory which perform a respective operation.

In some scenarios, a NAN device may perform negotiations with two devices simultaneously, which may lead to collisions in channel negotiation processes. For example, in a given discovery window a first device may begin to exchange data with a second device just before a third device begins to exchange data with the first device. A collision may occur if the first negotiation (between the first and second devices) is not completed prior to the beginning of the second negotiation (between the third and first devices). Thus, simultaneous negotiations on a single device may be undesirable. Hence, in some embodiments, to reduce potentially negative consequences due to coinciding negotiation sessions, NAN devices may operate to complete a first ongoing negotiation prior to performing a newer, second negotiation. Thus, in the example scenario above, the first device may wait (with timeout) until the first negotiation with the second device is complete before executing the second negotiation.

Figure 5A:
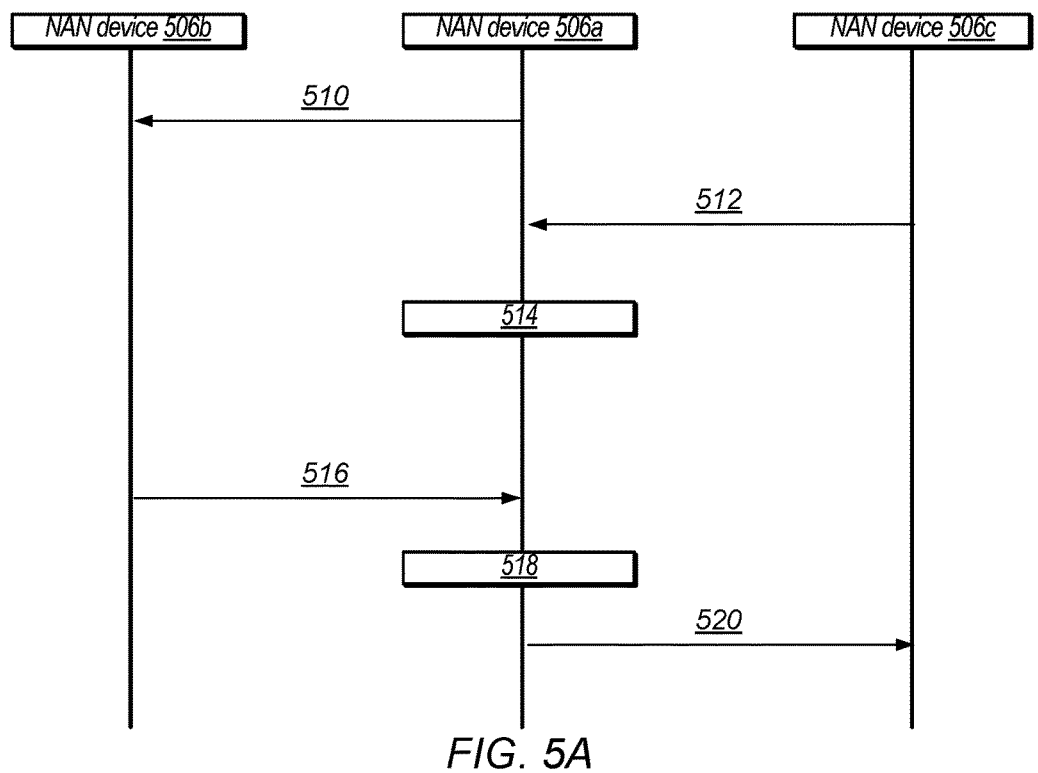
FIG. 5A illustrates an example process for coinciding NAN channel selection negotiation processes, according to some embodiments.

FIG. 5A illustrates a process for coinciding NAN channel selection negotiation processes, according to some embodiments. Note that the process illustrated in FIG. 5A may be used in conjunction with any of the systems or devices shown in the above Figures, among other devices. For example, NAN devices 506a-506c may include the features and elements as described above in reference to client station 106.

At 510, NAN device 506a may transmit (or send) a first unicast negotiation SDF to NAN device 506b. The SDF transmitted at 510 may include information (or parameters, e.g., a set of parameters) regarding preferred channels of NAN device 506a (e.g., parameters a1 and a2). For example, parameter a1 may represent or indicate a preferred channel for the 2.4 GHz band and parameter a2 may represent or indicate a preferred channel for the 5 GHz band.

At 512, NAN device 506a may receive a second unicast negotiation SDF from NAN device 506c prior to receiving a response from NAN device 506b. The SDF received at 512 may include information (or parameters) regarding preferred channels of NAN device 506c (e.g., parameters c1 and c2). For example, parameter c1 may represent or indicate a first preferred channel and parameter c2 may represent or indicate a second preferred channel.

At 514, since NAN device 506a has already initiated a first negotiation with NAN device 506b, NAN device 506a may wait for a response from NAN device 506b prior to processing the request from NAN device 506c.

At 516, NAN device 506a may receive a unicast SDF from NAN device 506b. The SDF received at 516 may include information (or parameters) regarding preferred channels of NAN device 506b (e.g., parameters b1 and b2 indicating the preferred channels of NAN device 506b).

At 518, NAN device 506a may evaluate the received channel information from NAN device 506b in relation to its own preferred channels. For example, NAN device 506a may determine to adopt a channel indicated by parameter b1 as its base channel, e.g., because the channel has a higher preference score than channels indicated by parameters b2, a1, and a2. Thus, device NAN device 506a may adopt the channel in its preferences. For example, NAN device 506a may replace parameter a1 with parameter b1, in its preferences, so that if parameter b1 indicates a 2.4 GHz channel, device 506a may modify its preferred 2.4 GHz NAN channel and associated preference score to the channel indicated by parameter b1 and its preference score. However, device 506a may retain parameter a2 to indicate its preferred 5 GHz channel.

At 520, after completing the first unicast negotiation, NAN device 506a may now respond to the second negotiation from NAN device 506c. Thus, NAN device 506a may transmit (or send) a unicast negotiation SDF advertising parameters b1 and a2 to indicate its preferred channels to NAN device 506c. Both NAN device 506a and NAN device 506c may operate to compare the four preferred channel parameters c1, c2, a2, and b1 by similar processes to select a common base channel.

Figure 5B:
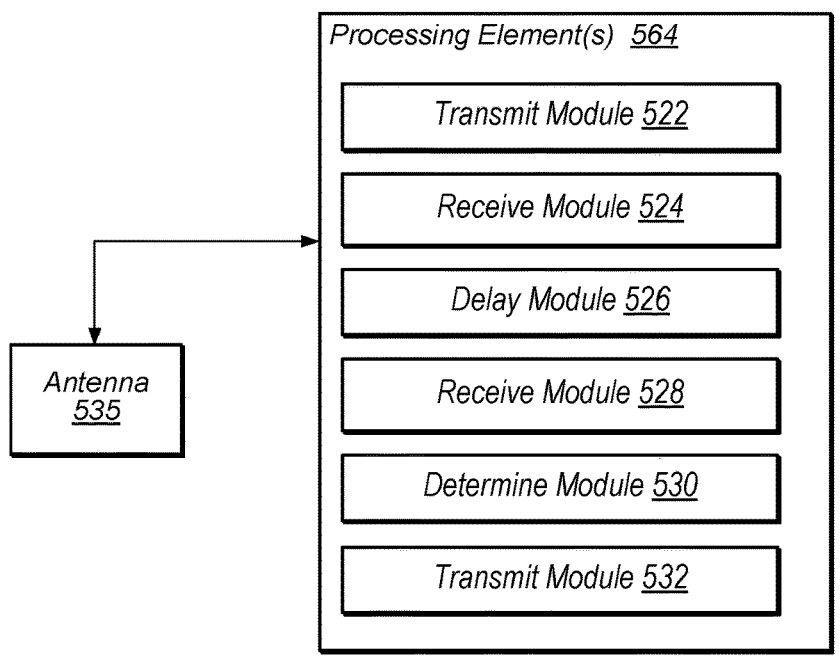
FIG. 5B illustrates an example processing element including modules for coinciding NAN channel selection negotiation processes, according to some embodiments.

FIG. 5B illustrates a processing element including modules for coinciding NAN channel selection negotiation processes, according to some embodiments. In some embodiments, antenna 535 may be coupled (directly or indirectly) to processing element 564. The processing element may be configured to perform the method described above in reference to FIG. 5A. In some embodiments, processing element 564 may include one or more modules, such as modules (or circuitry) 522-532, and the modules (or circuitry) may be configured to perform various operations of the method described above in reference to FIG. 5A. In some embodiments, the processing element may be included in a client station, such as client station 106. As shown, the modules may be configured as follows.

In some embodiments, processing element 564 may include a transmit module 522 configured to transmit (or generate instructions to transmit) a first unicast negotiation SDF to a first NAN device. The SDF may include information (or parameters, e.g., a set of parameters) regarding preferred channels (e.g., parameters a1 and a2). For example, parameter a1 may represent or indicate a preferred channel for the 2.4 GHz band and parameter a2 may represent or indicate a preferred channel for the 5 GHz band.

In some embodiments, processing element 564 may include a receive module 524 configured to receive a second unicast negotiation SDF from a second NAN device prior to receiving a response from the first NAN device. The SDF may include information (or parameters) regarding preferred channels of the second NAN device (e.g., parameters c1 and c2). For example, parameter c1 may represent or indicate a first preferred channel and parameter c2 may represent or indicate a second preferred channel.

In some embodiments, processing element 564 may include a delay module 526 configured to delay response to the second NAN device. Thus, since a first negotiation has been initiated with the first NAN device, delay module may generate instructions to wait for a response from the first NAN device prior to processing the request from the second NAN device.

In some embodiments, processing element 564 may include a receive module 528 configured to receive a unicast SDF from the first NAN device. The may include information (or parameters) regarding preferred channels of the first NAN device (e.g., parameters b1 and b2 indicating the preferred channels the second NAN device).

In some embodiments, processing element 564 may include a determine module 530 configured to determine a base channel via evaluating the received channel information from the first NAN device in relation to its own preferred channels. For example, a channel indicated by parameter b1 may be adopted as its base channel, e.g., because the channel has a higher preference score than channels indicated by parameters b2, a1, and a2. Thus, parameter a1 may be replaced with parameter b1 in its preferences, so that if parameter b1 indicates a 2.4 GHz channel, device 506a may modify its preferred 2.4 GHz NAN channel and associated preference score to the channel indicated by parameter b1 and its preference score. However, parameter a2 may be retained to indicate its preferred 5 GHz channel.

In some embodiments, processing element 564 may include a transmit module 532 configured to transmit (or send) a unicast negotiation SDF advertising parameters b1 and a2 to indicate its preferred channels to the third NAN device. Both NAN devices may operate to compare the four preferred channel parameters c1, c2, a2, and b1 by similar processes to select a common base channel.

It is apparent for those skilled in the art that, for the particular processes of the modules (or circuitry) described above (such as modules 522, 524, 526, 529, 530, and 532), reference may be made to the corresponding operations (such as operations 510, 512, 514, 516, 518, and 520, respectively) in the related process embodiment sharing the same concept and the reference is regarded as the disclosure of the related modules (or circuitry) as well. Furthermore, processing element 564 may be implemented in software, hardware or combination thereof. More specifically, processing element 564 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 564 may be implemented as a general-purpose processor such as a CPU, and therefore each module can be implemented with the CPU executing instructions stored in a memory which perform a respective operation.

Figure 6A:
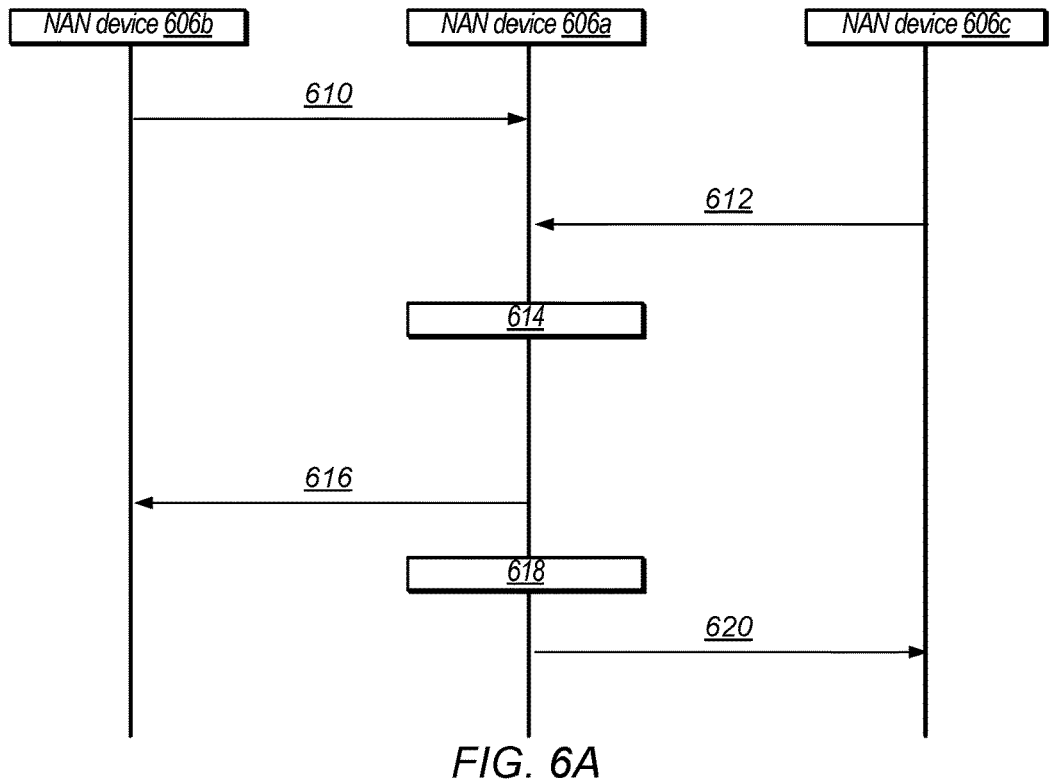
FIG. 6A illustrates an example scenario of coinciding NAN channel selection negotiation processes, according to some embodiments.

FIG. 6A illustrates an example scenario of coinciding NAN channel selection negotiation processes, according to some embodiments. Note that the process and signaling illustrated in FIG. 6A may be used in conjunction with any of the systems or devices shown in the above Figures, among other devices. For example, NAN devices 606a-606c may include the features and elements as described above in reference to client station 106.

At 610, NAN device 606a may receive a unicast negotiation SDF from NAN device 606b indicating preferred channels (e.g., a set of preferred channels and/or a set of parameters indicating preferred channels) of NAN device 606b (e.g., via parameters b1 and b2). Note that parameters b1 and b2 may correspond (or indicate) a channel in the 2.4 GHz band and a channel in the 5 GHz band, respectively.

At 612, prior to completing the processing of the negotiation with NAN device 606b, NAN device 606a may receive a second unicast negotiation communication (e.g., a second SDF) from NAN device 606c advertising parameters c1 (corresponding or indicating a channel in the 2.4 GHz band) and c2 (corresponding or indicating a channel in the 5 GHz ban) indicating NAN device 606c's preferred channels.

At 614, NAN device 606a may temporarily hold this second negotiation. In some embodiments, NAN device 606a may initiate (or start) a timer to monitor completion of the negotiation with NAN device 606b. In other words, NAN device 606a may designate an amount of time to complete the negotiation with NAN device 606b prior to responding to NAN device 606c.

At 616, NAN device 606a may respond to NAN device 606b. Thus, NAN device 606a may transmit a unicast negotiation SDF advertising parameters a1 and a2 to indicate NAN device A's preferred channels. NAN device 606a may also compare the four parameters a1, a2, b1, and b2 to select the optimal base channel.

At 618, NAN device 606a may select a channel indicated by parameter b2 as its base channel, e.g., because the channel indicated by channel b2 has a higher preference score than channels associated with parameter b1, a1, and a2, or otherwise according to the methods described above. NAN device 606a may then replace parameter a2 with parameter b2 to indicate its preferred 5 GHz channel.

In addition, after completing the negotiation with NAN device 606b, NAN device 606a may resume the second negotiation with NAN device 606c. Thus, NAN device 606a may compare its new preferred channels, as indicated by parameters a1 and b2, and their associated values with those received from NAN device 606c, e.g. channels indicated by parameters c1 and c2, to determine a base channel.

At 620, NAN device 606a may transmit (send) a unicast negotiation SDF advertising its new preferred channels (e.g., as indicated by parameters a1 and b2) to NAN device 606c so that NAN device 606c may also select the common base channel.

Figure 6B:
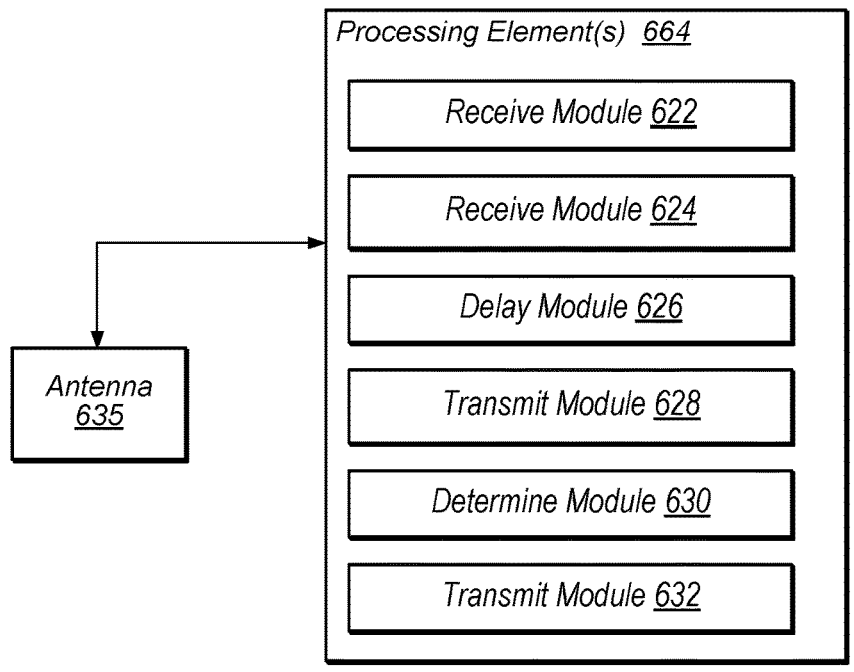
FIG. 6B illustrates an example processing element including modules for coinciding NAN channel selection negotiation processes, according to some embodiments.

FIG. 6B illustrates a processing element including modules for coinciding NAN channel selection negotiation processes, according to some embodiments. In some embodiments, antenna 635 may be coupled (directly or indirectly) to processing element 664. The processing element may be configured to perform the method described above in reference to FIG. 6A. In some embodiments, processing element 664 may include one or more modules, such as modules (or circuitry) 622-632, and the modules (or circuitry) may be configured to perform various operations of the method described above in reference to FIG. 6A. In some embodiments, the processing element may be included in a client station, such as client station 106. As shown, the modules may be configured as follows.

In some embodiments, processing element 664 may include a receive module 622 configured to receive a unicast negotiation SDF from a first NAN device indicating preferred channels (e.g., a set of preferred channels and/or a set of parameters indicating preferred channels) of the first NAN device (e.g., via parameters b1 and b2). Note that parameters b1 and b2 may correspond (or indicate) a channel in the 2.4 GHz band and a channel in the 5 GHz band, respectively.

In some embodiments, processing element 664 may include a receive module 624 configured to receive a second unicast negotiation communication (e.g., a second SDF) from a second NAN device advertising parameters c1 (corresponding or indicating a channel in the 2.4 GHz band) and c2 (corresponding or indicating a channel in the 5 GHz ban) indicating the second NAN device's preferred channels. The second unicast negotiation communication may be received prior to completing the processing of the negotiation with the first NAN device.

In some embodiments, processing element 664 may include a delay module 626 configured to delay (e.g., temporarily hold) negotiations with the second NAN device. In some embodiments, a timer to monitor completion of the first negotiation with the first NAN device may be initiated (or started). In other words, an amount of time to complete the first negotiation with the first NAN device prior to responding to the second NAN device may be specified and monitored.

In some embodiments, processing element 664 may include a transmit module 628 configured transmit a unicast negotiation SDF to the first NAN device advertising parameters a1 and a2 to indicate preferred channels.

In some embodiments, processing element 664 may include a determine module 630 configured to determine a base channel via evaluation of the four parameters a1, a2, b1, and b2. In other words, the four parameters may be compared to select an optimal base channel. For example, a channel indicated by parameter b2 may be selected as the optimal base channel, e.g., because the channel indicated by channel b2 has a higher preference score than channels associated with parameter b1, a1, and a2, or otherwise according to the methods described above. In addition, parameter a2 may be replaced with parameter b2 to indicate the preferred 5 GHz channel.

Further, after completing the negotiation with the first NAN, negotiations with the second NAN device may be resumed and the new preferred channels as determined during the first negotiation may be compared with the channels indicated by parameters c1 and c2 (e.g., as received from the second NAN device), to determine a base channel.

In some embodiments, processing element 664 may include a transmit module 632 configured to transmit a unicast negotiation SDF advertising its new preferred channels (e.g., as indicated by parameters a1 and b2) to the second NAN device so that the second NAN device may also select the common base channel.

It is apparent for those skilled in the art that, for the particular processes of the modules (or circuitry) described above (such as modules 622, 624, 626, 628, 630, and 632), reference may be made to the corresponding operations (such as operations 610, 612, 614, 616, 618, and 620, respectively) in the related process embodiment sharing the same concept and the reference is regarded as the disclosure of the related modules (or circuitry) as well. Furthermore, processing element 664 may be implemented in software, hardware or combination thereof. More specifically, processing element 664 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 664 may be implemented as a general-purpose processor such as a CPU, and therefore each module can be implemented with the CPU executing instructions stored in a memory which perform a respective operation.

Base Channel Propagation

Figure 7A:
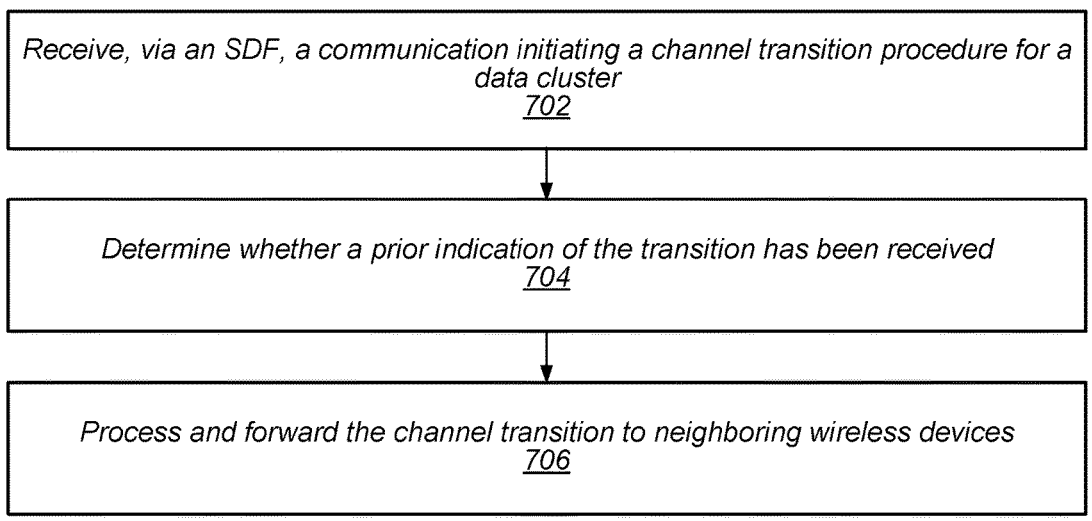
FIG. 7A illustrates an example method for a data cluster to migrate from a first base channel to a second base channel, according to some embodiments.

In some scenarios, a NAN device sharing a common base channel with other member NAN devices as part of a NAN data cluster may desire to change the base channel of the data cluster to a second NAN channel, e.g., a destination channel. FIG. 7A illustrates a method for a data cluster to migrate from a first base channel to a second base channel, according to some embodiments. The method shown in FIG. 7A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, a wireless device (e.g., a NAN device) may receive a communication from a neighboring wireless device initiating a channel transition procedure for a data cluster (e.g., a NAN data cluster) that includes the wireless device and the neighboring wireless device. In some embodiments, the neighboring wireless device, e.g., the triggering device, may communicate (transmit or send) a unicast channel transition request to its active data peers (e.g., neighboring wireless devices within the data cluster, including the wireless device) to initiate the transition. In some embodiments, the request may be sent via a unicast frame or a multicast frame that may be intended to be received by all non-active connection peers. In some embodiments, the frame may be a service discovery frame (SDF). In addition, the frame may include information regarding a destination channel, including the destination channel's associated preference score, as well as a transition timing synchronization function (TSF), which may indicate a future time at which the transition may be executed and which may also serve as a transition identification (ID).

At 704, the wireless device (and each of the active data peers of the neighboring wireless device (e.g., the trigger device)) may determine whether it has received prior indication of the transition. For example, the wireless device (as well as each of the active data peers of the neighboring wireless device) may compare the received transition identification to the transition identification of prior transition attempts, which may be stored on the wireless device.

At 706, in response to determining that the channel transition has a lowest transition ID, the wireless device may process and/or record information regarding the transition, such as the transition ID. In some embodiments, the wireless device may forward the transition request to each of its own active data peers. In this way the channel transition information may be propagated throughout the NAN data cluster in order to coordinate the NAN data cluster's execution of a base channel transition. Alternatively, if the wireless device determines it has already received an indication of the transition with a lower transition ID, it may disregard the transition request.

In some embodiments, each of the wireless devices in the data cluster may perform the transition in a discovery window (DW) immediately following the transition TSF. In this discovery window the wireless devices may begin to advertise their updated cluster information. Each wireless device may update its base channel to the destination channel, as well as update its preferred channel and associated preference score for the relevant band. For example, if the data cluster transitions to a certain 5.0 GHz channel, each member wireless device may update its preferred 5.0 GHz channel to the new base channel.

Figure 7B:
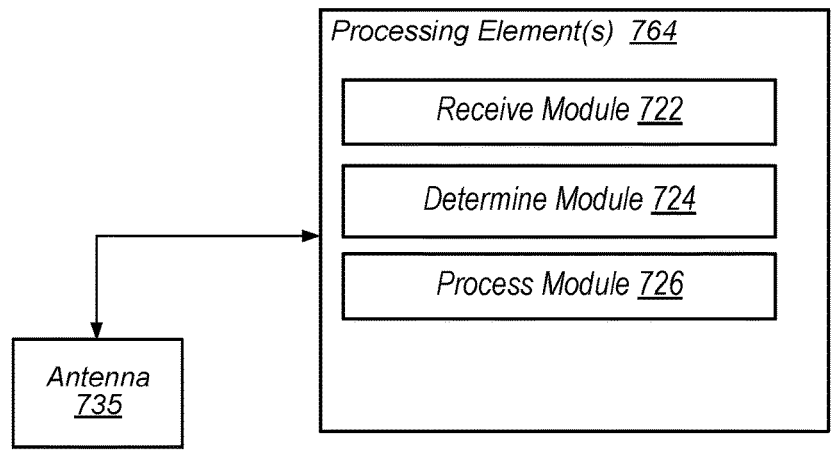
FIG. 7B illustrates an example processing element including modules for a data cluster to migrate from a first base channel to a second base channel, according to some embodiments.

FIG. 7B Figure illustrates a processing element including modules for negotiating a base channel between peer devices, according to some embodiments. In some embodiments, antenna 735 may be coupled (directly or indirectly) to processing element 764. The processing element may be configured to perform the method described above in reference to FIG. 7A. In some embodiments, processing element 764 may include one or more modules, such as modules (or circuitry) 722-726, and the modules (or circuitry) may be configured to perform various operations of the method described above in reference to FIG. 7A. In some embodiments, the processing element may be included in a client station, such as client station 106. As shown, the modules may be configured as follows.

In some embodiments, processing element 764 may include a receive module 722 configured to receive (or generate instructions to receive) a communication from a neighboring wireless device initiating a channel transition procedure for a data cluster (e.g., a NAN data cluster) that includes a wireless device and the neighboring wireless device. In some embodiments, the neighboring wireless device, e.g., the triggering device, may communicate (transmit or send) a unicast channel transition request to its active data peers (e.g., neighboring wireless devices within the data cluster, including the wireless device) to initiate the transition. In some embodiments, the request may be sent via a unicast frame or a multicast frame that may be intended to be received by all non-active connection peers. In some embodiments, the frame may be a service discovery frame (SDF). In addition, the frame may include information regarding a destination channel, including the destination channel's associated preference score, as well as a transition timing synchronization function (TSF), which may indicate a future time at which the transition may be executed and which may also serve as a transition identification (ID).

In some embodiments, processing element 764 may include a determine module 724 configured to determine whether it has received prior indication of the transition. For example, determine module 724 may compare the received transition identification to the transition identification of prior transition attempts, which may be stored on a memory in communication with the processing element.

In some embodiments, processing element 764 may include a process module 726 configured to process and/or record information regarding the transition. The information may include a transition ID. In some embodiments, process module 726 may be further configured to forward (or generate instructions to forward) the transition request to active data peers of the wireless device in response to determining that the channel transition has a lowest transition ID. In this way the channel transition information may be propagated throughout the NAN data cluster in order to coordinate the NAN data cluster's execution of a base channel transition. Alternatively, in some embodiments, process module 726 may be configured to disregard the transition request in response to determining it has already received an indication of the transition with a lower transition ID.

It is apparent for those skilled in the art that, for the particular processes of the modules (or circuitry) described above (such as modules 722, 724, and 726), reference may be made to the corresponding operations (such as operations 702, 704, and 706, respectively) in the related process embodiment sharing the same concept and the reference is regarded as the disclosure of the related modules (or circuitry) as well. Furthermore, processing element 764 may be implemented in software, hardware or combination thereof. More specifically, processing element 764 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 764 may be implemented as a general-purpose processor such as a CPU, and therefore each module can be implemented with the CPU executing instructions stored in a memory which perform a respective operation.

In some embodiments, a second channel transition procedure may take place prior to the fulfillment of the first channel transition. For example, a NAN device in the data cluster may trigger a second channel transition or may receive an indication of a second channel transition before the transition TSF of the first transition is reached. In some embodiments, the transition procedure with the lower TSF transition value may take precedence. Thus, the channel transition scheduled to be executed at an earlier time may be used. In some embodiments, once the transition has been successfully performed, the other (later) transition may be initiated. After the NAN data cluster has completed a channel transition, member NAN devices may be able to communicate with their active date peers using the new base channel.

Flexible Absences

In a NAN system, NAN devices may signal their future availability using a device presence indication. For example, a NAN device may use a further availability map attribute to indicate time windows in which it may plan to be present. The NAN device may also provide absence indications, which may be defined as either flexible or inflexible. A device may provide a flexible absence indication when the absence interval can be aligned to channel sequence slots. For example, this type of indication may be desirable to maintain active data exchange, especially data exchange that may require at least one 16 TU (time unit) slot duration, with an access point or group owner. Conversely, a device may provide an inflexible absence indication when the absence interval may not be aligned to channel sequence slots or is significantly shorter than a single 16 TU slot. An inflexible absence indication may be desirable in scenarios where the device desires to maintain synchronization with an access point or group owner (every N*DTIM), in coexistence scenarios (e.g., while simultaneously operating Bluetooth or other technologies), or in one shot scans, which may be split into small segments of absence (similar to coexistence scenarios).

In some embodiments, NAN communication between peer devices may use a single base channel. NAN devices having flexible absences may advertise their absences in every discovery window (DW). Based on its own conditions and/or current operating demands, each device may individually determine how to divide time resources between the NAN base channel and flexible absences. To increase the likelihood of peer NAN devices allocating the same time slots for NAN communications, e.g., to increase the overlap of time dedicated by different NAN devices to the base channel so that they can more frequently communicate with each other, a series of timing rules, e.g., flexible absence timing rules, may be applied. These rules may be further understood with reference to FIGS. 8 and 9.

Figures 8, 9:
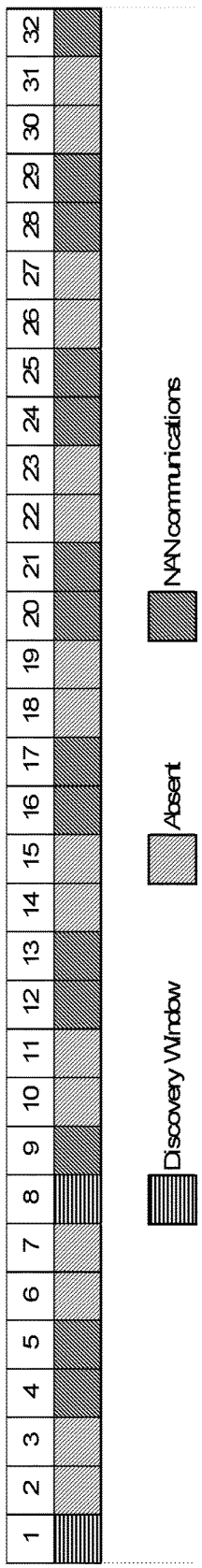
FIG. 8 illustrates an example template sub-frame schedule for a NAN device in a NAN data cluster, according to some embodiments.
FIG. 9 illustrates an example scheme for the tradeoff of sub-frames, according to some embodiments.

FIG. 8 illustrates a template sub-frame schedule for a NAN device in a NAN data cluster, according to some embodiments. As illustrated, the sub-frame (1 slot=16 TUs) schedule may begin with a discovery window (sub-frame 1), followed by two absence sub-frames, two NAN-available sub-frames, two more absence sub-frames, and then another discovery window at sub-frame 8. Sub-frame 9 may include another NAN availability period, and the rest of the sub-frames (up to 32 sub-frames) may follow the pattern of alternating pairs of absent and available sub-frames. This pattern may provide a maximum NAN data latency of 3 sub-frames (48 TUs), a NAN data bandwidth of 14 sub-frames (approximately 43% of the total sub-frames), a maximum non-NAN data latency of 2 sub-frames (32 TUs) and a non-NAN data bandwidth of 16 sub-frames (50% of the total sub-frames).

In some embodiments, this baseline schedule framework may be insufficient for the demands of certain communications scenarios, e.g., more bandwidth may be desired for certain types of communication, e.g., for NAN or non-NAN communications. For example, if NAN communications require more bandwidth, resources may be appropriated from non-NAN-dedicated sub-frames to boost (increase) the bandwidth for NAN communications. As another example, less NAN bandwidth may be desired, e.g., to reduce device power consumption. Thus, the NAN bandwidth may be reduced by replacing NAN-dedicated sub-frames with absent sub-frames. In such embodiments, the baseline schedule may be altered by trading sub-frames according to a uniform scheme across all peer NAN devices in order to increase the likelihood of peer devices boosting or reducing the same shared NAN sub-frames, and thus of maintaining more sub-frames in common.

FIG. 9 illustrates an example scheme for the tradeoff of sub-frames, according to some embodiments. As illustrated, for each additional sub-frame to be swapped, a specific sub-frame may be indicated as the next to be modified. Thus, as shown, the first absent sub-frame to be replaced with a NAN sub-frames, should more bandwidth be desired for NAN communications, may be sub-frame 15; the next sub-frame may be sub-frame 23. Similarly, should more absent sub-frames be desired, e.g., to conserve power consumption, the first NAN-dedicated sub-frame to be replaced with an absent sub-frame may be sub-frame 17, followed by sub-frame 25.

In some embodiments, the baseline schedule may provide sufficient bandwidth for both NAN and non-NAN communications. In such embodiments, battery consumption or other factors may be considered and may influence bandwidth allotment, or otherwise the baseline schedule may be used without alterations.

Advertising Base Channel and Device Presence

In some embodiments, each device in a NAN data cluster may advertise its base channel and its expected absences in an SDF beacon in every discovery window. If a device modifies its expected absences (which may be unlikely to happen before every discovery window) the device may also send unicast frames, e.g., SDFs, in the discovery windows to each active data peer to inform them of this change.

In some embodiments it may be desirable to reevaluate or refresh the base channel selection of a NAN data cluster after some period of time. This may avoid overly elevated base channel preference scores, which may otherwise steadily increment over a long period of time and potentially exaggerate the merit of the base channel in relation to other usable channel. In such embodiments, a timestamp age value may be added to the final base channel modification time. When this timestamp value expires according to various factors, each NAN device in the data cluster may reset its channel preferences to preferred values (but not to the base channel). Thus, during the next base channel negotiation procedure, the base channel may be "safely" modified according to the updated value.

In some embodiments, each NAN device may maintain a local channel preference score, as well as a base channel preference score, which may be cluster based. Once the timestamp associated with the cluster base channel score has expired, the NAN device may reset the cluster base channel score to its own local channel preference score. Hence, the NAN device may not maintain a cluster base channel score that has expired.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising;
    a memory; and
    a processing element in communication with the memory, wherein the processing element is configured to:
        generate instructions to advertise a first set of one or more channel preferences corresponding to a wireless device;
        receive a second set of one or more channel preferences from a neighboring wireless device associated with a common device cluster;
        determine, using the first and second sets of one or more channel preferences and a comparison of associated preference scores, a base channel for use in peer-to-peer communication by devices associated with the common device cluster, including the wireless device and the neighboring wireless device, wherein if two or more preferred channels have an equal highest preference score, the processing element is further configured to determine the base channel from the two or more preferred channels having the equal highest preference score based, at least in part on, a comparison of medium access control (MAC) addresses associated with the wireless device and the neighboring wireless device, wherein a channel proposed by a device with the highest MAC address is selected; and
        generate instructions to advertise a third set of one or more channel preferences that include an indication of the determined base channel.

2. The apparatus of claim 1,
    wherein the first set of one or more channel preferences include at least one of:
        one or more channels unsupported by the wireless device;
        one or more preferred channels of the wireless device;
        a current base channel of the wireless device; or
        information regarding the association of the wireless device to a neighbor awareness networking (NAN) data cluster.

3. The apparatus of claim 1,
    wherein the instructions to advertise include instructions to transmit a service discovery frame comprising the first set of one or more channel preferences corresponding to a wireless device.

4. The apparatus of claim 3,
wherein the service discovery frame comprises a unicast service discovery frame or a multicast discovery frame.

5. The apparatus of claim 1,
wherein at least one of the first set or the second set of one or more channel preferences indicates an unsupported channel of the wireless device or the neighboring wireless device; and
wherein to determine the base channel, the processing element is further configured to disqualify the unsupported channel from consideration as the base channel.

6. The apparatus of claim 1,
wherein if two or more preferred channels have an equal highest preference score, the processing element is further configured to determine the base channel from two or more preferred channels having the equal highest preference score based further on:
  a preferred channel proposed by a wireless device belonging to a data cluster over a channel preferred by a wireless device that is not a member of a data cluster; or
  a 5 GHz band channel over a 2.4 GHz band channel.

7. A wireless device, comprising:
at least one antenna;
at least one radio configured to perform Wi-Fi communication with a Wi-Fi access point;
at least one processor communicatively coupled to the at least one radio, wherein the wireless device is configured to perform voice and/or data communications;
wherein the at least one processor is configured to:
  determine first channel preferences of the wireless device;
  determine a first base channel for use in peer-to-peer communication by devices associated with a common device cluster, including the wireless device and at least one neighboring wireless device;
  transmit first information regarding the first base channel and the first channel preferences to the at least one neighboring wireless device;
  receive second information regarding a second base channel of an other neighboring wireless device;
  negotiate a third base channel with the at least one neighboring wireless device, including receiving second channel preferences from the at least one neighboring wireless device and comparing the first and second channel preferences, including associated channel preference scores to determine the third base channel, wherein if two or more preferred channels have an equal highest preference score, the at least one processor is further configured to determine the third base channel from the two or more preferred channels having the equal highest preference score based, at least in part on, a comparison of medium access control (MAC) addresses associated with the wireless device and the at least one neighboring wireless device, wherein a channel proposed by a device with the highest MAC address is selected; and
  wait until the negotiation with the at least one neighboring wireless device is complete prior to negotiating with the other neighboring wireless device.

8. The wireless device of claim 7,
wherein the first information comprises at least one of:
  one or more channels unsupported by the wireless device;
  one or more preferred channels of the wireless device;
  the first base channel; or
  information regarding the association of the wireless device to a neighbor awareness networking (NAN) data cluster.

9. The wireless device of claim 7,
wherein the wireless device is configured to transition to the third base channel without communicating the transition to the at least one neighboring wireless device, and
wherein the at least one neighboring wireless device is configured to independently transition to the third base channel based on the first and second preferences.

10. The wireless device of claim 7,
wherein, to transmit the first information, the at least one processor is further configured to transmit a service discovery frame comprising the first information.

11. The wireless device of claim 10,
wherein the service discovery frame comprises a unicast service discovery frame or a multicast discovery frame.

12. The wireless device of claim 7,
wherein at least one of the first set or the second set of one or more channel preferences indicates an unsupported channel of the wireless device or the neighboring wireless device.

13. The wireless device of claim 7,
wherein if two or more preferred channels have an equal highest preference score, the at least one processor is further configured to determine the base channel from two or more preferred channels having the equal highest preference score based further on:
  a preferred channel proposed by a wireless device belonging to a data cluster over a channel preferred by a wireless device that is not a member of a data cluster; or
  a 5 GHz band channel over a 2.4 GHz band channel.

14. A non-transitory computer readable memory medium storing program instructions executable by processing circuitry of a wireless device to:
  generate instructions to advertise, within a device cluster, a first set of one or more channel preferences corresponding to the wireless device;
  receive a second set of one or more channel preferences from a first neighboring wireless device associated with the device cluster, wherein the first set and the second set of one or more channel preferences indicate one or more preferred channels with associated preference scores;
  receive a third set of one or more channel preferences from a second neighboring wireless device associated with the device cluster;
  determine, after the second and third set of one or more channel preferences have been received and based at least in part on the first and second sets of one or more channel preferences, a base channel for use in peer-to-peer communication by devices associated with the device cluster, wherein if two or more preferred channels have an equal highest preference score, the program instructions are further executable to determine the base channel from two or more preferred channels having the equal highest preference score based, at least in part on, a comparison of medium access control (MAC) addresses associated with the wireless device and the first neighboring wireless device, wherein a channel proposed by a device with the highest MAC address is selected;
  generate instructions to transmit, after the base channel is determined, a fourth set of one or more channel preferences to a third neighboring wireless device; and generate instructions to advertise an updated set of one or more channel preferences that include an indication of the determined base channel.

15. The non-transitory computer readable memory medium of claim 14,
wherein the program instructions are further executable to:
determine that the base channel is not a current base channel of the wireless device; and
generate instructions to transition to the base channel without communicating the transition to the first and second neighboring wireless devices.

16. The non-transitory computer readable memory medium of claim 15,
wherein, to transition to the base channel, the program instructions are further executable to generate instructions to transition to the base channel in a next occurring discovery window after the instructions to transition have been generated.

17. The non-transitory computer readable memory medium of claim 14,
wherein the program instructions are further executable to select, prior to generating instructions to advertise the first set of one or more channels and based at least in part on the first set of one or more channel preferences, a current base channel of the wireless device.

18. The non-transitory computer readable memory medium of claim 14,
wherein the first set of one or more channel preferences include at least one of:
one or more channels unsupported by the wireless device;
one or more preferred channels of the wireless device;
a current base channel of the wireless device; or
information regarding the association of the wireless device to a neighbor awareness networking (NAN) data cluster.

19. The non-transitory computer readable memory medium of claim 14,
wherein if two or more preferred channels have an equal highest preference score, the program instructions are further executable to determine the base channel from two or more preferred channels having the equal highest preference score based further on:
a preferred channel proposed by a wireless device belonging to a data cluster over a channel preferred by a wireless device that is not a member of a data cluster; or
a 5 GHz band channel over a 2.4 GHz band channel.

20. The non-transitory computer readable memory medium of claim 14,
wherein the instructions to advertise include instructions to transmit a service discovery frame comprising the first set of one or more channel preferences corresponding to a wireless device, and wherein the service discovery frame comprises a unicast service discovery frame or a multicast discovery frame.

* * * * *